United States Patent [19]

Brault

[11] Patent Number: 5,220,740

[45] Date of Patent: Jun. 22, 1993

[54] MOVABLE STAND

[76] Inventor: Bertrand W. Brault, 14, 2nd Avenue, Warwick, Quebec, Canada, J0A 1M0

[21] Appl. No.: 908,389

[22] Filed: Jul. 6, 1992

[51] Int. Cl.$^5$ ............................................. G09F 15/00
[52] U.S. Cl. ........................................ 40/606; 40/612; 280/47.27; 280/47.131; 248/910
[58] Field of Search ............... 40/606, 607, 610, 612; 280/47.131, 47.17, 47.24, 47.27; 248/129, 910; 273/1.5, 411

[56] References Cited

U.S. PATENT DOCUMENTS

| | | | |
|---|---|---|---|
| 1,498,646 | 6/1924 | Dahl | 280/47.131 |
| 1,912,642 | 6/1933 | Lewis | 40/606 |
| 3,025,058 | 3/1962 | Brumfield | 273/1.5 R |
| 3,119,588 | 6/1964 | Keats | 40/606 |
| 3,288,413 | 11/1966 | Gregory | 248/910 |
| 3,415,475 | 12/1968 | Goodman | 248/910 |
| 3,841,631 | 10/1974 | Dolan | 273/1.5 R |
| 4,724,681 | 2/1988 | Bartholomew | 280/47.17 |
| 4,749,101 | 6/1989 | Durkan | 280/47.17 |
| 4,953,744 | 9/1990 | Koyama | 280/47.17 |

FOREIGN PATENT DOCUMENTS 60957 9/1982 European Pat. Off. .......... 40/606
670360 4/1952 United Kingdom .............. 248/910

OTHER PUBLICATIONS

1989 School Mail Order Catalog, "Basketball" by Korney Board Aids.

Primary Examiner—Peter M. Cuomo
Assistant Examiner—Flemming Saether
Attorney, Agent, or Firm—Roland L. Morneau

[57] ABSTRACT

A movable stand made of a base member having a flat bottom surface adapted to rest on the ground and with a pair of rotatable wheels mounted under the base member on an axle adjacent and within the periphery of the base member. The wheels are mounted under the base member at such a level so that their periphery does not touch the ground when the base member rests on its bottom surface. The base member is provided with a connecting means to receive a stick handle above and substantially midway between the wheels. The base member is accordingly adapted to be tilted by the stick handle for bringing the wheels in contact with the ground and for moving the base member from one location to another in its tilted position. The base member is provided on its top surface with a selection of perforations and stumps for upstandingly receiving a post carrying a pictogram.

9 Claims, 3 Drawing Sheets

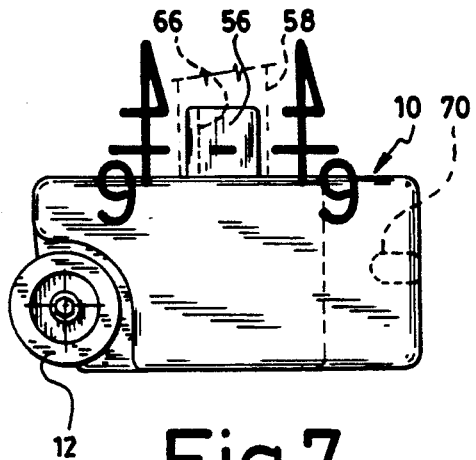
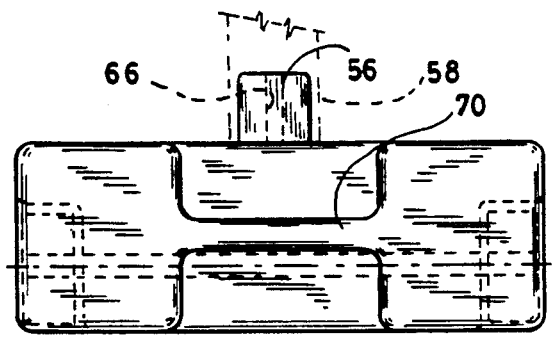
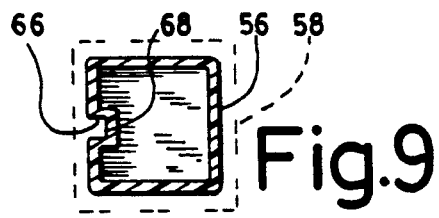
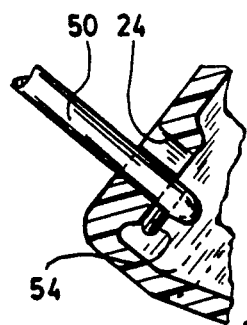
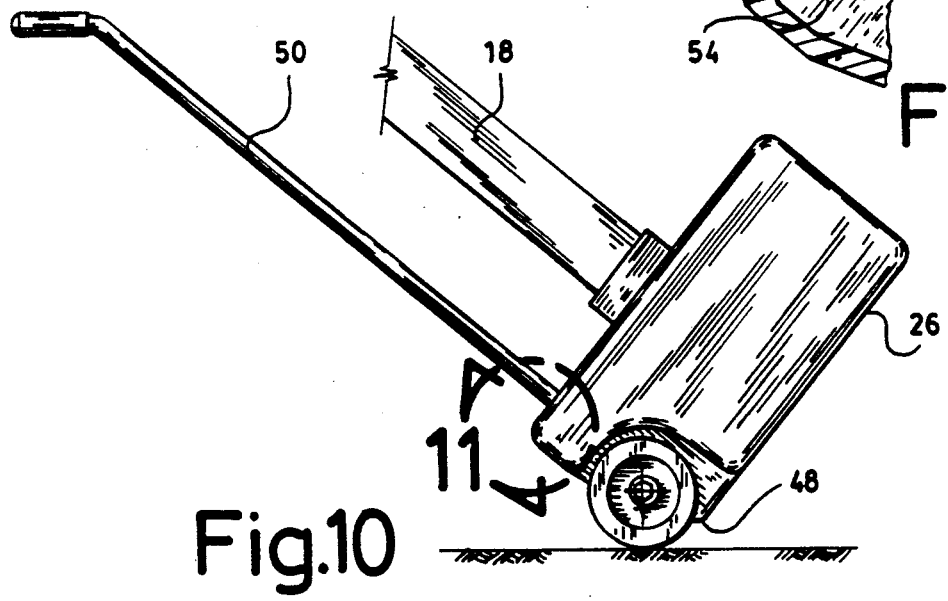

MOVABLE STAND

BACKGROUND OF THE INVENTION

1. Field of the Invention

The invention is directed to a movable stand adapted to support a removable pictogram or any article which needs to be temporarily located in one spot. It is particularly suitable as a portable stop sign comprising a base member and a detachable handle. The base member has a pair of wheels spaced from but adjacent to the floor, so that the handle, which is eccentrically connected to the base member in the direction of the wheels is adapted to tilt the base member for resting the latter on the wheels.

2. Prior Art

G. M. Carter U.S. Pat. No. 2,590,509 discloses a portable traffic sign comprising a circular base around which the sign is adapted to be moved.

A portable illuminated signal person station is disclosed in A. R. Pasquale U.S. Pat. No. 4,777,751. A pair of wheels are rotatably supported by distal brackets away from the horizontal frame. The horizontal frame is raised from the floor and stands on four legs. A vertical frame adapted to tilt the horizontal frame is located on a plane between the rear end of the horizontal plane and the wheels. Such an arrangement does not promote an easy transfer of the station from the legs to the wheels. Furthermore, the horizontal platform is not provided with means for vertically supporting a post.

SUMMARY OF THE INVENTION

The present invention is directed to a movable stand made of a base member having a flat bottom surface adapted to rest on the ground and with a pair of rotatable wheels mounted under the base member on an axle adjacent and within the periphery of the base member. The wheels are mounted under the base member at such a level so that their periphery does not touch the ground when the base member rests on its bottom surface. The base member is provided with a connecting means to receive a stick handle above and substantially midway between the wheels. The base member is accordingly adapted to be tilted by the stick handle for bringing the wheels in contact with the ground and for moving the base member from one location to another in its tilted position.

The base member is provided on its top surface with a selection of perforations and stumps for upstandingly receiving a post carrying a pictogram.

BRIEF DESCRIPTION OF THE DRAWINGS

FIG. 7 is a side view of the movable stand according to the invention, FIG. 8 is a front view of the movable stand shown in FIG. 7, FIG. 9 is a cross-sectional view along line 9—9 of FIG. 7, FIG. 10 is a side view of the movable stand in a tilted position, and FIG. 11 is an enlarged view of encircled portion 11 shown in FIG. 10.

DETAILED DESCRIPTION OF THE INVENTION

Figure 1:
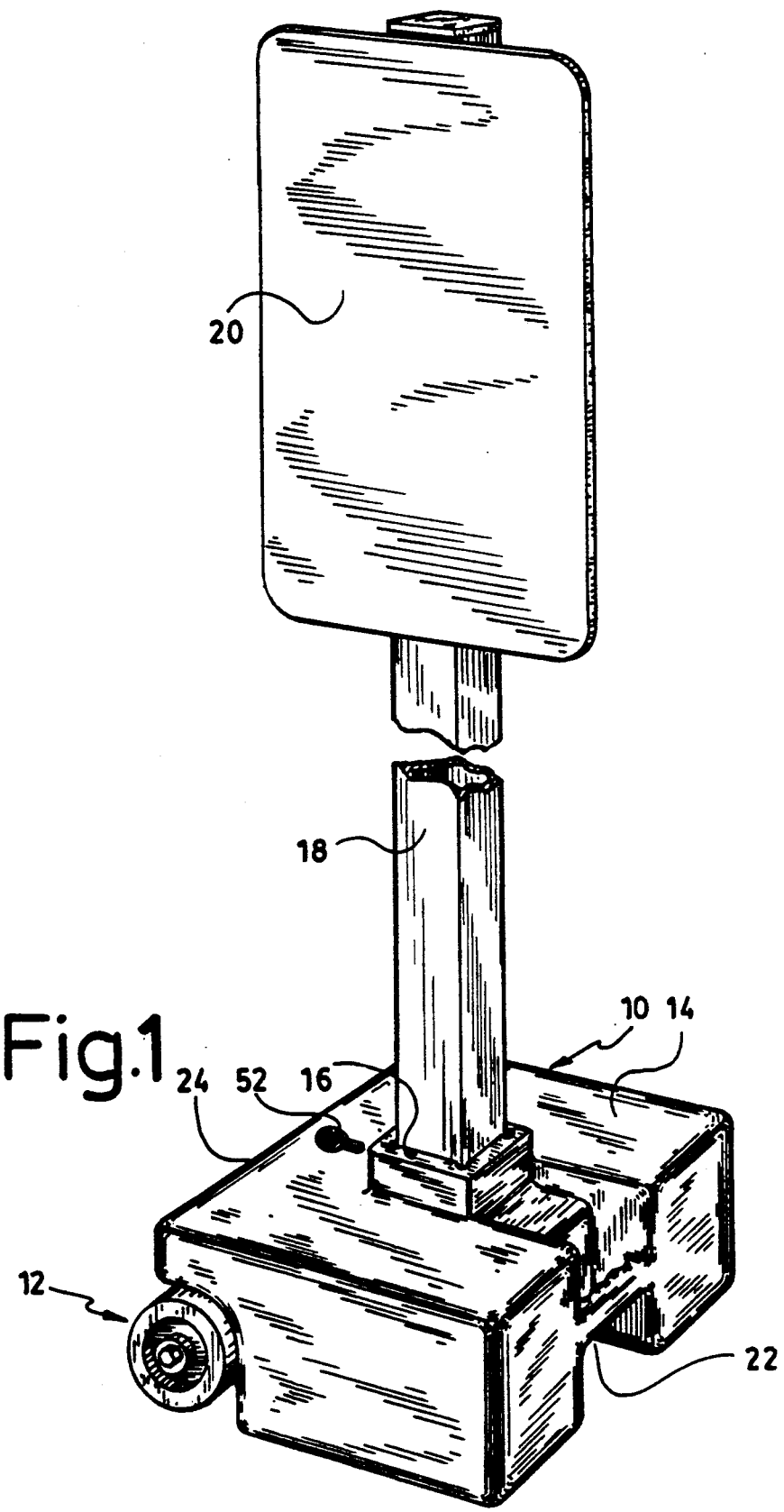
FIG. 1 is an isometric view of a movable stand according to the invention supporting a post and a pictogram.
Figure 2:
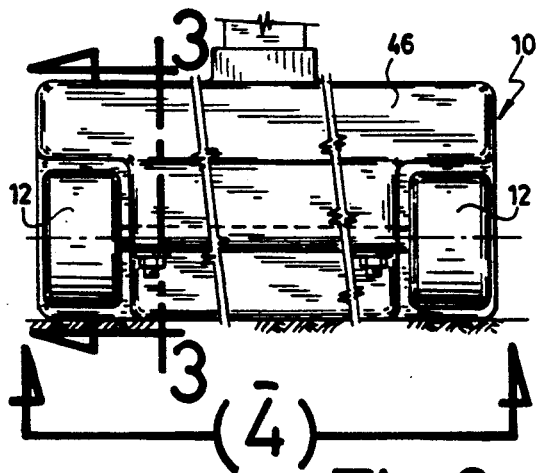
FIG. 2 is a rear view of the movable stand shown in FIG. 1.
Figure 3:
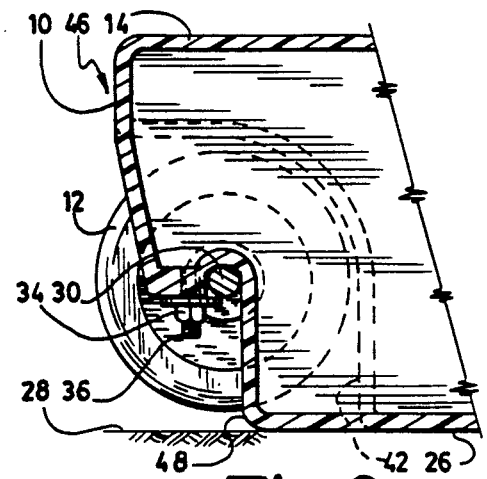
FIG. 3 is a cross-sectional view along line 3—3 of FIG. 2.
Figure 4:
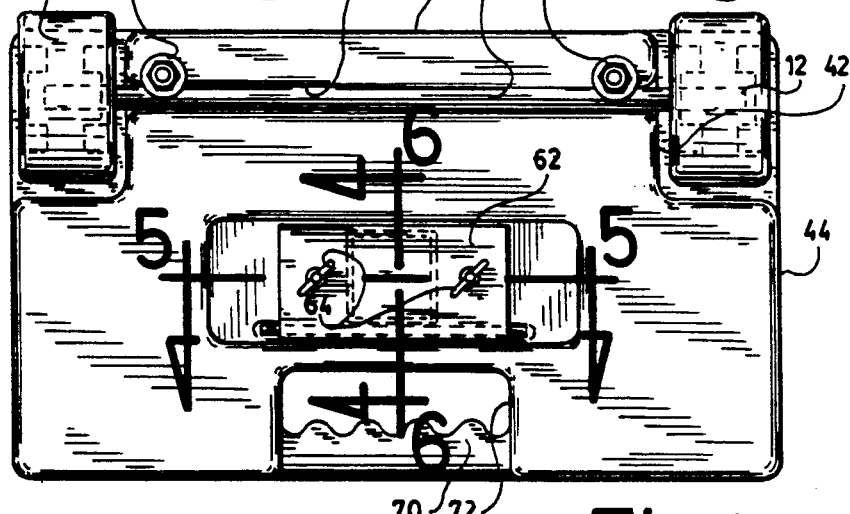
FIG. 4 is a bottom view along arrows 4 shown in FIG. 2.

FIG. 1 illustrates a movable stand according to the invention which is essentially made of a base member 10 provided with wheels 12. The upper surface 14 of the base member 10 is provided with an aperture 16 adapted to vertically receive a post 18 intended to support a sign or pictogram 20. The block member 10 is preferably provided with a handle 22 for manually lifting the base member 10 particularly when the latter needs to be stored. The upper surface of the block member is further provided with a perforation 24 adapted to receive a stick handle (described later) for tilting the base member 10 over the wheels 12 when the base member needs to be moved from one location to another.

The base member 10 is essentially made of a single weighted block and preferably has a square or rectangular contour. The lower surface 26 of the base member 10 is adapted to rest on the floor 28 while the wheels 12 have their periphery at a level above the level of the ground 28. The wheels 12 are supported by an axle 30 which extends across the width of the base member 10. The axle 30 extends in a recess provided in the base member 10 and is held in that recess 32 by a pair of nuts 34, bolts 36 and washers 38. The axle 30 is mounted adjacent and along the rear face 40 of the base member 10 and supports the wheels 12 located in recesses 42 provided on the sides 44 of the base member 10 and extending through the lower surface 26.

The axle 30 is located within the perimeter of the base member 10, that is, adjacent the rear face 46 and substantially parallel to the rear edge 48 of the lower surface 26. The perimeter of the wheels 12 being closely adjacent the floor 28, when the base member 10 is tilted backwardly, the weight of the latter moves quickly from the lower surface 26 to the edge 48 and to the perimeter of the wheel 12 within a very small angle of tilt.

The tilting is obtained by a stick handle 50 which is adapted to project into the perforation 24 which is located substantially above the wheels 12 approximately midway between both wheels 12. According to one embodiment for retaining the handle 50 into the perforation 24, the latter is provided with a slot 52 extending from a substantially circular perforation 24 in order to receive a substantially cylindrical stick handle 50 which is provided with a lateral projection 54 adapted to slide into the slot 52. The stick handle 50 is locked inside the perforation 24 by rotating the projections 54 from the direction of the slot 52 to an opposite direction as shown in FIG. 11. The relative position of the wheels 12 and the edge 48 of the bottom surface 26 facilitate the tilting of the base member 10 with the stick handle 50.

Figure 5:
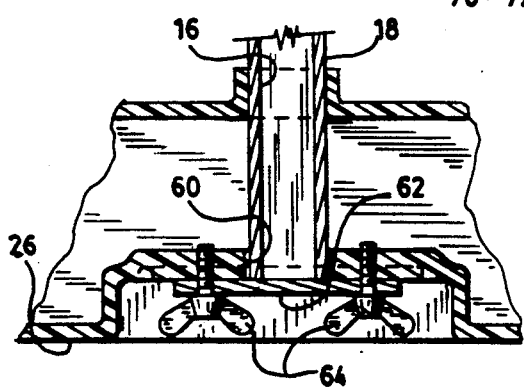
FIG. 5 is a cross-sectional view along line 5—5 of FIG. 4.
Figure 6:
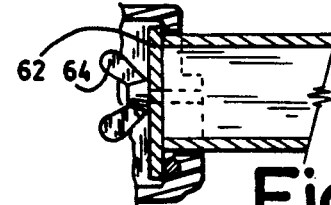
FIG. 6 is a cross-sectional view along line 6—6 of FIG. 4.

The present base member 10 on which the pair of wheels 12 is mounted according to the above description and on which the stick handle 50 can be temporarly fixed has a plurality of uses as a movable stand, that is, a stand which needs to be moved from one location to another and remain in such locations for a relatively short period of time. For instance, the movable stand, according to the invention, is contemplated as a stand for traffic signs, for supporting a post for various games such as for holding the basket in basketball, for holding the net in tennis or badminton games and for generally holding pictograms or shelves. For such a purpose, the base member 10 is provided with connecting means characterized by a stump member upwardly extending over the top surface of the base member 10 or by an aperture such as 16 illustrated in FIGS. 1 and 5. The post 18 which is adapted to support an item such as the sign 20 in FIG. 1, is fittingly adapted to be mounted in the aperture 16 and be upstandingly retained thereinto. The connecting means is also contemplated as a stump member 56 over which a post 58 is adapted to be slidden thereinto and be retained in an upstanding position.

The post 18 is additionally held in an upstanding position by a corresponding aperture 60 in a recessed portion of the bottom surface 26. The bottom of the post 18 is vertically supported by a plate 62 threadedly held to the bottom surface 26 by a pair of wing nuts 64.

The aperture 60 provided in the bottom surface 26 of the base member 10 is also contemplated as an opening for the introduction of a weighted filling material inside the base member 10 whenever the latter is hollow. The filling material may consist of water, sand or similar material intended to provide weight to the base member 10. The quantity and the density of the filling material corresponds to the weight which needs to be maintained in the base member 10. Such weight varies with the height of the post 18, the size of the pictogram 20 and in general the purpose for which the base member 10 is intended to be used.

The stump member 56, preferably has an indentation 66 corresponding to an internal rib 68 inside the post 58 for ascertaining a predetermined orientation of the post 58 relative to the stump member 56 and the base member 10. Such predetermined orientation may have various uses. In particular, as shown in FIG. 1, it is preferred to orient the plane of the sign 20 crosswise relative to the axle 30 of the wheels 12 so that when the wind exerts a pressure on the surface of the sign 20, the post 18 and the sign 20 will not tilt in the direction of the wheels 12, thereby preventing the stand to move unintentionally.

A gripping handle 70 is also provided within the periphery of the base member 10. For this purpose, the shape of the contour of the base member 10 is restricted in thickness to form a recess 72 provided along the periphery of the base member 10. The handle 70 is used particularly when the stand is hollow, empty and needs to be manually stored away.

We claim:

1. A movable stand adapted to support a load comprising a base member made of a weighted block having a flat bottom surface adapted to rest on the ground, a pair of rotatable wheels having an axle mounted across said base member adjacent and within said base member, said wheels being mounted in recesses provided in said base member so that said wheels extend downwardly to a level above the level of said bottom surface, said base member having a rear face extending below and between said wheels for defining an edge with said bottom surface, a stick handle removably connected to a connection means located on a top surface of said base directly above said wheels and substantially midway therebetween, supporting means fixed on top of said base member, in front of said wheels for supporting said load, whereby said base member and said supporting means are tilted with the use of said stick handle by pivoting on said edge for lowering said wheels and bringing said wheels in contact with the ground and to be moved on said wheels from one location to another in its tilted position.

2. A movable stand as recited in claim 1, wherein said connection means is characterized by a perforation in said base member, said perforation adapted to receive one end of said stick handle.

3. A movable stand as recited in claim 2, wherein said perforation is located substantially above said rear face.

4. A movable stand as recited in claim 1, wherein said means for supporting a load comprises a stump member upwardly extending from said base member above said bottom surface, said stump member adapted to support a hollow post.

5. A movable stand as recited in claim 1, wherein said base member has an aperture extending through said base member for defining a gripping member adapted to manually carry said stand.

6. A movable stand as recited in claim 1, wherein said base member has a box-like shape having a substantially rectangular perimeter, said axle being mounted to said base member parallel to said rear face, said base member having a recessed portion at each end of said axle, said wheels being located in said recessed portions.

7. A movable stand as recited in claim 6, wherein said base member has a cavity for receiving weighted material, said load comprising a post and a pictogram adapted to be movably transported by said wheels.

8. A movable stand as recited in claim 1, wherein said supporting means is characterized by a substantially vertical channel for supportingly receiving a post adapted to display a pictogram.

9. A movable stand as recited in claim 8, wherein said base member is hollow and has a removable plate located on a underside of said base member to support said post and means for removing said plate to provide access inside said base member for the introduction of weighted material.

* * * * *